United States Patent [19]  
Blount

[11] 4,125,703  
[45] * Nov. 14, 1978

[54] PROCESS FOR THE PRODUCTION OF PHENOL SILICATE COMPOUNDS AND THEIR CONDENSATION PRODUCTS

[76] Inventor: David H. Blount, 5450 Lea St., San Diego, Calif. 92105

[*] Notice: The portion of the term of this patent subsequent to Jun. 28, 1994, has been disclaimed.

[21] Appl. No.: 842,910

[22] Filed: Oct. 17, 1977

[51] Int. Cl.² .............................................. C08G 8/04
[52] U.S. Cl. ................................... 528/95; 260/19 R; 260/19 EP; 260/448.8 R; 521/155; 528/29; 528/39; 528/44; 423/324; 423/325; 423/326
[58] Field of Search .................. 260/2 S, 2 EP, 2 EC, 260/2 A, 2.5 AM, 2.5 AV, 2.5 S, 19 R, 19 EP, 51 R, 51 EP, 53 R, 56 R, 57 R, 57 A, 57 C, 77.5 AP, 77.5 AM, 77.5 R, 448.8 R; 423/324, 325, 326

[56] References Cited  
U.S. PATENT DOCUMENTS 4,032,511  6/1977  Blount .............................. 260/46.5 R  
4,036,787  7/1977  Blount ................................. 260/2 S

OTHER PUBLICATIONS

Condensed Chemical Dictionary, pp. 842 and 843, Seventh Edition (1966).

Primary Examiner—Melvyn I. Marquis

[57] ABSTRACT

Phenol compounds and fine granular silica will chemically react to produce phenol silicate compounds when heated in an aqueous solution with a suitable alkali catalyst. The phenol silicate compounds are then reacted with an aldehyde, epoxy and polyisocyanate compounds to produce resinous products.

29 Claims, No Drawings

PROCESS FOR THE PRODUCTION OF PHENOL SILICATE COMPOUNDS AND THEIR CONDENSATION PRODUCTS

BACKGROUND OF THE INVENTION

This invention relates to a process for the production of phenol silicate compounds by chemically reacting a fine granular silica with a phenol compound in the presence of an alkali catalyst and in an aqueous solution. The phenol silicate compounds is then reacted chemically with organic aldehydes to produde poly (aldehyde phenol silicate) resinous products.

The silica ($SiO_2$) may be produced by any of the commonly known methods. It is preferred that the silica be in the form of fine granules or powder.

Phenol silicate compounds will react chemically with diisocyanates, dicarboxyl acids, dicarboxyl anhydrides, ketones, aldehydes and epoxy compounds and resins to produce useful resinous products which may be dissolved in suitable organic solvents and may be used as a protective coating for wood. Phenol silicate compounds may be used as fillers in paints and varnishes. The poly (aldehyde phenol silicate) resinous products may be used as molding powders. The molding powders are heated to the softening or melting temperature then molded into useful products such as tool handles, ash trays, knobs, etc. The poly (aldehyde phenol silicate) resinous product may be used as casting resins by pouring the said liquid resin into a mold of a useful product and continuing to heat until an insoluble solid resinous product is formed. Solutions of aldehyde phenol silicate resinous products may be used as adhesives, paints, varnishes, impregnants and laminates.

In U.S. Pat. No. 4,032,511, issued to David H. Blount, various silicoformic acids and hydrated silica were utilized. No silica ($SiO_2$) was utilized in that process. To react silica with a phenol compound, a stronger alkali catalyst is required than required to react hydrated silica ($SiO_2xH_2O$) with a phenol compound.

SUMMARY OF THE INVENTION

I have discovered that silica will react chemically with phenols in the presence of a strong alkali catalyst at a temperature just below the boiling temperature of the phenol to produce a phenol silicate when a 1:1 mol ratio is used. When 2 mols of silica are reacted with 1 mol of a dihydric phenol, a phenol disilicate is produced.

While all of the details of the reactions which take place are not fully understood, it appears that the silica generally reacts with one of the hydroxyl groups of the phenol compound to produce a phenol silicate compound.

The reactions of this invention may take place under any suitable physical condition. While many of the reactions will take place acceptably at ambient temperature and pressure, in some cases, better results may be obtained at somewhat elevated temperatures and pressures. On the other hand it may be desirable to reduce the pressure to aid in removing the water and solvents such as glycerol.

DETAILED DESCRIPTION OF THE INVENTION

Any suitable phenol compound may be used in my novel process. Typical phenols include phenol, m-cresol, p-cresol, o-cresol, xylenols, resorcinol, cashew nut shell liquids, anacordol, p-tert-butyl phenol, p-tert-amyl phenol, p-phenyl phenol, cardol, anacardic acid, Bis-phenol A, creosote oil, chlorophenol, nitrophenol, hydroquinone, pyrogallol and naphthol.

Any suitable alkali catalyst may be used to promote the reaction. The catalytic mechanism which takes place is not fully understood. The alkali may act as a catalyst directly, or it may react slightly with one or the other of the primary reactants. The alkali catalyst is added to the aqueous solution until the pH is 10 to 12.

Typical alkali catalysts include alkali metal hydroxide and alkaline earth metal hydroxide. The preferred alkali metal hydroxides are sodium hydroxide and potassium hydroxide. The preferred alkaline earth metal hydroxide is calcium hydroxide.

The phenol silicate compounds produced by this method are light gray to brown in color, granular, and soften when heated to about 85° C. but are destroyed by further heating. The phenol silicate compounds are soluble in aqueous formaldehyde, aldehydes, polyalcohols, acetic acid, acetones dilute alkali metal solutions, dilute sulfuric acid and other organic solvents.

Various aldehydes may be used to produce aldehyde phenol silicate resinous products such as formaldehyde, acetaldehyde, butyaldehyde, chloral, acrolein, paraformaldehyde, furfural, crotonaldehyde and mixtures thereof. The aldehyde ratio may vary from about 0.5 to 3 mols of aldehyde to 1 mol of phenol silicate compounds, depending on the methyol groups desired.

Various catalysts may be used to enhance the reaction between phenol silicate compounds and aldehydes. They may be acidic, basic or neutral. Some of the acid catalyst which may be used are sulfuric acid, sodium hydrogen sulfate, hydrochloric acid, formic acid, acetic acid, oxalic acid, tartaric acid and aromatic sulfonic acid. Some of the basic catalysts are sodium carbonate, sodium silicate, ammonia, sodium hydroxide, potassium hydroxide, calcium hydroxide, urea and quatarnary ammonium hydroxide.

The preferred method of this invention to produce a poly (aldehyde phenol silicate) resinous product by heating phenol and silica in the ratio of 1:1 mols in the presence of an alkali catalyst, sodium hydroxide in an aqueous solution wherein the pH is 10 to 12, thereby producing a gray, granular phenol silicate. An aqueous formaldehyde solution is added in the ratio of 1 to 3 mols to each mol of phenol silicate and is heated until a poly (aldehyde phenol silicate) resinous product is produced. In an alternative embodiment an acid catalyst is added to the mixture of phenol silicate and formaldehyde until the pH is 3 to 6, then heated until poly (formaldehyde phenol silicate) resinous product is produced. Hexamethylene tetramine may be added to the acid catalized poly (formaldehyde phenol silicate) resinous product to produce a hard, tough product when molded with heat and pressure.

Various epoxy compounds such as epichlorohydrin, glycidol, methyl epichlorohydrin; 1, 2-epoxy-3-phenoxypropane; 3, 4-epoxyethyl benzene; 1, 2-epoxybutane; 1, 2-epoxycyclohexane, epoxyethane; 1, 2-epoxypropane; 1-chloro-2, 3-epoxypropane; 1:2, 3:4-diepoxybutane; 2:3, 6:7-diepoxy-2, 6-dimethyl-4-octene; epoxyethylbenzene, epoxides of polyhydroxy compounds containing 2 or more epoxy radicals per molecule, epoxidized unsaturated vegetable oils, epoxidized unsaturated fatty acids, phenoxy resins containing 2 or more epoxy radicals per molecule, epoxidized unsaturated organic compounds such as diolefin or polyolefin compounds or mixtures thereof, may be chemically reacted with the phenol silicate compounds and poly (aldehyde phenol silicate) resinous products to produce epoxy silicate resinous products. Epichlorohydrin is the preferred epoxy compound.

Various isocyanates such as arylene, polyisocyanates such as tolylene, metaphenylene; 4-chlorophenylene -1, 3-; methylene-bis-(phenylene-4-), bisphenylene-4,4'-, 3,3"dimethoxy-bisphenylene-4,4', 3,3'-diphenylbiphenylene-4,4', naphthalene-1,5- and tetrahydronaphthalene-1,5-diisocyanates and triphenylmethane triisocyanate; alkylene polyisocyanates such as ethylene, ethylidene, propylene-1,2-, butylene 1,4-, butylene-1,3-, hexylene-1,6-, decaethylene-1,10-, cyclohexylene-1,2-, cyclohexylene-1,4-, and methylene-bis-(cyclohexyl-4,4'-) diisocyanates. Toluene diisocyanates, commercially the most widely used diisocyanates are preferred, especially a mixture of 80% of the 2,4-isomer and 20% of the 2,6-isomer thereof. Inorganic polyisocyanates are also suitable according to the invention.

The primary object of the present invention is to produce phenol silicate compounds. Another primary object of the present invention is to produce phenol silicate compounds that will react chemically with aldehydes to produce poly (aldehyde phenol silicate) resinous products. Another object is to produce phenol silicate compounds which will react chemically with epoxy compounds to produce epoxy silicate resinous products. Still another object is to produce phenol silicate compounds which will react chemically with polyisocyanates to produce urethane silicate resinous products and/or foam.

DESCRIPTION OF PREFERRED EMBODIMENTS

The following examples which describe certain preferred embodiments of the processes may, of course, be varied as described above with similar results. Parts and percentages are by weight unless otherwise indicated.

EXAMPLE 1

About 2 parts by weight of fine granular silica ($SiO_2$), 4 parts by weight of phenol and 1 part by weight of sodium hydroxide flakes are added to 20 parts by weight of water then mixed and heated to 70° to 120° C. while agitating at ambient temperature and pressure for 30 to 120 minutes, thereby producing gray granules of phenol silicate.

EXAMPLE 2

About 2 parts by weight of fine granular silica ($SiO_2$), 3 parts by weight of phenol and 0.5 part by weight of potassium hydroxide are added to 10 parts by weight of water then heated to 70° to 120° C. while agitating at ambient pressure for 30 to 120 minutes; the water evaporates thereby producing gray granules of phenol silicate.

EXAMPLE 3

The phenol silicate compound produced on Example 1 is added to an aqueous solution of formaldehyde in the ratio of 1 to 1 mols. The mixture is then heated to 70° to 120° C. for 10 to 90 minutes while agitating at ambient pressure thereby producing a poly(adelhyde phenol silicate) resinous product (formaldehyde phenol silicate resinous product).

The resinous product may be poured into a mold of useful products such as tool handles, knobs, etc. then heating continued until a solid, hard, tough product is formed.

EXAMPLE 4

The phenol silicate compound produced in Example 2 is added to an aqueous solution of formaldehyde in the ratio of 1 to 3 mols. A dilute mineral acid, hydrochloric acid, is added to the mixture until the pH is 5 to 6 then heated to 65° to 120° C. for 10 to 90 minutes while agitating at ambient pressure thereby producing poly (formaldehyde phenol silicate) resinous product.

The poly (formaldehyde phenol silicate) resinous product is soluble in suitable organic solvents and may be used as a protective coating on wood.

EXAMPLE 5

About 1 mol of fine granula silica, one mol of phenol and 3 mols of formaldehyde in an aqueous solution are mixed, then sodium hydroxide flakes are added until the pH is 10 to 12. The mixture is then heated to 70° to 120° C. while agitating at ambient pressure for 30 to 120 minutes or until the desired viscosity is obtained thereby producing a gray formaldehyde phenol silicate resinous product. An acid, sodium hydrogen sulfate, is added to the liquid resinous product until the pH is 5 to 7, and the mixture is poured into a mold and heating is continued, thereby producing a hard, tough, useful product.

EXAMPLE 6

About 2 mols of the phenol silicate compound produced in Example 1, and 3 mols of furfural are mixed. The mixture is then heated to 70° to 120° C. while agitating at ambient pressure for 30 to 120 minutes, thereby producing a furfural phenol silicate resinous product.

The liquid resinous product may be poured into a mold of a useful product, then a dilute mineral acid is added while agitating until the pH is 5 to 6 thereby producing a brown, tough, solid furfural phenol silicate resinous product.

EXAMPLE 7

2 parts by weight of silica, 1 part by weight of sodium hydroxide and 4 parts by weight of water are mixed then heated to 80° to 100° C. while agitating until the water evaporates thereby producing activated gray silica granules. 3 parts by weight of cresylic acid and 4 parts by weight water are mixed then heated to 70° to 120° C. while agitating at ambient pressure for 30 to 120 minutes thereby producing brown granules of cresylic silicate compound.

About equal parts by weight of cresylic silicate compound and furfuryl alcohol are mixed, then a mineral acid such as dilute sulfuric acid is added until the pH is 5 to 6 while agitating for 10 to 20 minutes thereby producing a furfuryl cresylic silicate resinous product.

The furfuryl cresylic silicate resinous product may be poured into a mold for a useful product while in the liquid state and then solidifies into a brown, tough, resinous product. Other acids such as hydrochloric acid, phosphoric acid and acetic acid and sodium hydrogen sulfate may be used as the catalyst in this reaction to produce poly (furfuryl phenol silicate) resins.

EXAMPLE 8

2 parts by weight of fine granular silica, 3 parts by weight of cresol, 1 part by weight of potassium hydroxide and 5 parts by weight of water are mixed then heated to 70° to 120° C. while agitating for 30 to 120 minutes thereby producing brown granules of phenol silicate compounds.

About equal parts by weight of the phenol silicate compounds and acetaldehyde are mixed then heated to 70° to 120° C. for 10 to 90 minutes while agitating at ambient pressure thereby producing acetaldehyde cresol silicate resinous product.

EXAMPLE 9

2 parts by weight of fine granular silica, 4 parts by weight of creosote, 1 part by weight of sodium hydroxide and 6 parts by weight of water are mixed then heated to 70° to 120° C. while agitating at ambient pressure for 30 to 120 minutes thereby producing brown phenol silicate compounds.

About equal parts by weight of the brown phenol silicate compounds, paraformaldehyde and water are mixed then heated to 70° to 120° C. while agitating for 30 to 120 minutes thereby producing poly (paraformaldehyde phenol silicate) resinous product.

EXAMPLE 10

2 parts by weight of fine granular silica, 2 parts by weight of resorcinol, 1 part by weight of sodium hydroxide, and 5 parts by weight of water are mixed then heated to 70° to 120° C. while agitating at ambient pressure for 30 to 120 minutes thereby producing a mixture of resorcinol silicate and resorcinol disilicate.

EXAMPLE 11

About 2 parts by weight of the mixture of resorcinol silicate and resorcinol disilicate as produced in Example 10, are mixed with one part by weight of acrolein then heated to 70° to 120° C. while agitating for 30 to 120 minutes thereby producing poly (acrolein resorcinol silicate) resinous product.

EXAMPLE 12

About 2 parts by weight of the mixture of resorcinol silicate and resorcinol disilicate as produced in Example 10 are mixed with 0.5 to 2 parts by weight of epichlorohydrin then heated to just below the boiling temperature of epichlorohydrin for 20 to 40 minutes while agitating at ambient pressure thereby producing an epoxy silicate resin. The resin is cured by mixing in about 1 part weight of an amine, diethylenetriamine, thereby producing a hard, tough, epoxy silicate resinous product. The epoxy silicate resinous product may be used as a protective coating on wood.

EXAMPLE 13

About 2 parts by weight of a fine granular silica, 2 parts by weight of phenol, 1 part by weight of cashew nut shell liquids, 1 part by weight of sodium hydroxide flakes and 10 parts by weight of water are mixed then heated to 70° to 120° C. while agitating at ambient pressure for 30 to 120 minutes thereby producing phenol silicate compounds.

About 2 parts by weight of the phenol silicate compound, 3 parts by weight of crotonaldehyde and 6 parts by weight of water are mixed then heated to 70° to 120° C. while agitating at ambient pressure for 30 to 120 minutes thereby producing a yellowish brown poly (crotonaldehyde phenol silicate) resinous product.

EXAMPLE 14

The process for the production of phenol silicate compounds and resinous products by the following steps:
1. mixing about 1 part by weight of a fine granular silica ($SiO_2$) and 1 to 2 parts by weight of phenol;
2. adding an aqueous solution of an alkali catalyst, sodium hydroxide until the pH is 10 to 12.
3. heating the mixture to 70° to 120° C. while agitating for 30 to 120 minutes
4. thereby producing a granular phenol silicate compound.
5. adding an aldehyde, butylaldehyde, in the ratio of 0.5 to 3 mols of each mol of the phenol compound;
6. heating said mixture to 70° to 120° C. for 30 to 120 minutes while agitating, thereby
7. producing a poly (butylaldehyde phenol silicate) resinous product.

EXAMPLE 15

The process for the production of phenol silicate compounds and their resinous products by the following steps:
1. providing a fine granular silica;
2. providing a phenol compound, p-cresol;
3. mixing silica and p-cresol in the ratio of 1 part by weight of silica to 1 to 3 parts by weight of p-cresol;
4. adding an alkali catalyst, potassium hydroxide in an aqueous solution, until the pH is 10 to 12;
5. adding an aldehyde, a 37% aqueous solution of formaldehyde, in the ratio of 0.5 to 3 mols to each mol of the phenol compound;
6. heating said mixture to 70° to 120° C. for 30 to 120 minutes while agitating;
7. adding an acid, acetic acid, until the pH is about 3 to 5, and continue heating thereby
8. producing a poly (adelhyde phenol silicate) resinous product.

EXAMPLE 16

1 part by weight of phenol silicate compound as produced in Example 1 and 0.5 to 1 part by weight of toluene diisocyanate (80% 2,4; 20% 2,6) are mixed, then agitated at ambient temperature and pressure for 10 to 20 minutes thereby producing a poly (urethane silicate) prepolymer.

About 1% to 3% by weight of glacial acetic acid is added, percentage based on weight of silicate resinous product, and the mixture begins to expand in 3 to 10 minutes thereby producing a self standing poly (urethane silicate) foam.

Other catalysts may be utilized in place of acetic acid to cure the resinous product or produce foam, such as, water, methyl morpholine, diethylethanolamine, aqueous solution of butynediol. Various foaming regulators, foam stabilizers and blending agents may be added with the catalyst.

The poly (urethane silicate) foam may be used for insulation, as protective coating on wood and for floatation.

EXAMPLE 17

One part by weight of the poly (adelhyde phenol) resinous product as produced in Example 3 and 0.5 to 1 part by weight of a polyisocyanate, toluene diisocyanate, are mixed, then agitated at ambient temperature and pressure for 10 to 20 minutes thereby producing a poly (urethane silicate) prepolymer.

About 1% to 3% by weight of glacial acetic acid is added to the poly (urethane silicate) prepolymer and the mixture begins to expand in 3 to 10 minutes thereby producing a self standing poly (urethane silicate) foam.

The said foam may be used for insulation and floatation.

EXAMPLE 18

1 part by weight of poly (aldehyde phenol silicate) resinous product as produced in Example 3 and 0.5 to 2 parts by weight of epichlorohydrin are mixed, then heated to a temperature just below the boiling temperature of epichlorohydrin while agitating at ambient pressure for 20 to 40 minutes thereby producing an epoxy silicate resinous product.

The epoxy silicate resinous product is cured by a catalyst such as Lewis acids and amine compounds.

The epoxy silicate resinous product may be used as a coating agent and used on fiberglass cloth to produce rigid panels, etc.

EXAMPLE 19

1 part by weight of the phenol silicate compound as produced in Example 1 is mixed with 0.5 to 3 parts by weight of furfuryl alcohol then heated to 70° to 120° C. for 30 to 120 minutes thereby producing a brown, liquid poly (furfuryl phenol silicate) resinous product. The resinous product is cured by adding an acid compound such as sulfuric acid, hydrochloric acid, phosphoric acid, acetic acid and sodium hydrogen sulfate, thereby producing a brown solid, tough resinous product.

Although specific conditions and ingredients have been described in conjunction with the above Examples of preferred embodiments, these may be varied and other reagents and additives may be used where suitable, as described above with similar results.

Other modifications and applications of this invention will occur to those skilled in the art upon reading this disclosure. Those are intended to be included within the scope of this invention as defined in the appended claims.

I claim:

1. The process for the production of phenol silicate compounds and their resinous products by the following steps:
   (a) mixing about 1 part by weight of fine granular silica ($SiO_2$) and 1 to 2 parts by weight of a phenol compound;
   (b) adding an alkali catalyst in an aqueous solution until the pH is 10 to 12;
   (c) heating said mixture to 70° to 120° C. while agitating for 30 to 120 minutes, thereby
   (d) producing a granular phenol silicate compound.

2. The process of claim 1 wherein the phenol compound is selected from the group consisting of phenol, p-cresol, o-cresol, m-cresol, cresylic acid, xylenols, resorcinol, cashew-nut shell liquids, anacordol, p-tert-butyl phenol, cardol, anacardic acid, Bisphenol A, creosote oil, 2,6-dimethylphenol, and mixtures thereof.

3. The process of claim 1 wherein the alkali catalyst is selected from the group consisting of sodium hydroxide and potassium hydroxide.

4. The process of claim 1 including the further steps of:
   (a) adding an aldehyde in the ratio of 0.5 to 3 mols of each mol of the phenol compound;
   (b) heating said mixture to 70° to 120° C. for 30 to 120 minutes while agitating, thereby
   (c) producing a poly (aldehyde phenol silicate) resinous product.

5. The process of claim 4 wherein the aldehyde is selected from the group consisting of formaldehyde, acetaldehyde, butylaldehyde, acrolein, paraformaldehyde, furfural, crotonaldehyde, and mixtures thereof.

6. The process of claim 4 including the further step of adding an acid catalyst until the pH is 4 to 6 following step (a) and before step (b).

7. The process of claim 6 wherein the acid catalyst is selected from the group consisting of sulfuric acid, hydrochloric acid, acetic acid, formic acid, oxalic acid, aromatic sulfonic acid, sodium hydrogen sulfate and mixtures thereof.

8. The process of claim 1 wherein the phenol compound is phenol.

9. The method of claim 4 wherein the aldehyde is formaldehyde in an aqueous solution.

10. The process for the production of phenol silicate resinous products by the following steps:
    (a) adding 1 part by weight of fine granular silica to 1 to 3 parts by weight of a phenol compound, selected from the group consisting of phenol, p-cresol, o-cresol, m-cresol, cresylic acid, xylenols, resorcinol, cashew-nut shell liquids, anacordol, p-tert-butyl phenol, p-tert-amyl phenol, p-phenyl phenol, cardol, anacardic acid, Bisphenol A, creosote oil, 2,6-dimethylphenol and mixtures thereof;
    (b) adding an alkali catalyst, in an aqueous solution to the silica and phenol compound, selected from the group consisting of sodium hydroxide and potassium hydroxide until the pH is 10 to 12;
    (c) adding an aldehyde to said mixture in the ratio of 0.5 to 3 mols to each mol of the phenol compound, and the aldehyde is selected from the group consisting of formaldehyde in an aqueous solution, acetaldehyde, butylaldehyde, acrolein, paraformaldehyde, furfural, crotonaldehyde and mixtures thereof;
    (d) heating said mixture to 70° to 120° C. for 30 to 120 minutes while agitating, thereby
    (e) producing a poly(aldehyde phenol silicate) resinous product.

11. The process of claim 10 wherein an acid selected from the group consisting of sulphuric acid, hydrochloric acid, acetic acid, formic acid, oxalic acid, aromatic sulfonic acids, sodium hydrogen sulfate and mixtures thereof is added until the pH is about 3 to 5 in step (e) after the mixture has been heated for 30 to 120 minutes while agitating.

12. The phenol silicate compound as produced by the process of claim 1.

13. The poly(aldehyde phenol silicate) resinous product as produced by the process of claim 4.

14. The poly(aldehyde phenol silicate) resinous product as produced by the process of claim 10.

15. The process of claim 1 wherein additional steps are taken as follows:
    (a) mixing 1 part by weight of said phenol silicate compound with 0.5 to 2 parts by weight of an epoxy compound, epichlorohydrin;
    (b) heating the mixture to a temperature just below the boiling temperature of epichlorohydrin for 20 to 40 minutes while agitating at ambient pressure, thereby
    (c) producing an epoxy silicate compound.

16. The process of claim 1 wherein additional steps are taken as follows:
(a) mixing 1 part by weight of said phenol silicate compound with 0.5 to 1 part by weight of a polyisocyanate, then agitated at ambient temperature and pressure for 10 to 20 minutes, thereby
(b) producing a poly (urethane silicate) prepolymer;
(c) adding 1 to 3% by weight of curing catalyst, percentage based on the weight of the urethane silicate resinous product, and the mixture expands, thereby
(b) producing a self standing poly (urethane silicate) foam.

17. The process of claim 10 wherein additional steps are taken as follows:
(a) mixing 1 part by weight of said poly (aldehyde phenol silicate) resinous product with 0.5 to 2 parts by weight of an epoxy compound, epichlorohydrin;
(b) heating said mixture to a temperature just below the boiling temperature of epichlorohydrin for 20 to 40 minutes, thereby producing an epoxy silicate resinous product.

18. The process of claim 10 wherein additional steps are taken as follows:
(a) mixing 1 part by weight of said poly (adelhyde phenol silicate) resinous product with 0.5 to 1 part by weight of a polyisocyanate, then agitating for 10 to 20 minutes, thereby
(b) producing poly (urethane silicate) prepolymer;
(c) adding 1 to 3% by weight of glacial acetic acid, percentage based on the weight of the urethane silicate resinous product, and the mixture expands, thereby
(d) producing a self standing poly (urethane silicate) foam.

19. The process of claim 1 wherein additional steps are taken as follows:
(a) mixing about equal parts by weight of the phenol silicate compound and furfuryl alcohol
(b) adding a mineral acid until the pH is 5 to 6 while agitating for 10 to 20 minutes, thereby
(c) producing poly (furfuryl phenol silicate) resinous product.

20. The process of claim 16 wherein the polyisocyanate is selected from the group consisting of arylene polyisocyanates and alkylene polyisocyanates.

21. The process of claim 16 wherein the polyisocyanate is is toluene-2,4-diisocyanate, toluene-2,6-diisocyanate and mixtures thereof.

22. The poly (urethane silicate) foam as produced by the process of claim 16.

23. The poly (urethane silicate) foam as produced by the process of claim 18.

24. The epoxy silicate resinous product as produced by the process of claim 17.

25. Th poly (furfuryl phenol silicate) resinous product as produced by the process of claim 19.

26. The epoxy silicate compound as produced by the process of claim 15.

27. The process of claim 16 wherein the curing catalyst is selected from the group consisting of water, glacial acetic acid, aqueous solution of butynediol and mixtures thereof.

28. The process of claim 15 wherein a catalytic amount of a curing catalyst, selected from the group consisting of Lewis acids and amine compounds, is added to the epoxy silicate compound thereby producing an epoxy silicate product.

29. The epoxy silicate product as produced by the process of claim 28.

* * * * *